(12) United States Patent
Guthrie et al.

(10) Patent No.: US 7,215,511 B2
(45) Date of Patent: May 8, 2007

(54) MAGNETIC WRITE HEAD WITH GAP TERMINATION LESS THAN HALF DISTANCE BETWEEN PEDESTAL AND BACK GAP

(75) Inventors: Hung-Chin Guthrie, Saratoga, CA (US); Edward Hin Pong Lee, San Jose, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 420 days.

(21) Appl. No.: 10/816,062

(22) Filed: Mar. 31, 2004

(65) Prior Publication Data

US 2005/0219748 A1  Oct. 6, 2005

(51) Int. Cl.
G11B 5/31 (2006.01)
G11B 5/23 (2006.01)
G11B 5/235 (2006.01)

(52) U.S. Cl. .................. 360/126; 360/119; 360/120
(58) Field of Classification Search ................ 360/126, 360/317, 122, 119, 120
See application file for complete search history.

(56) References Cited

U.S. PATENT DOCUMENTS

| | | | |
|---|---|---|---|
| 5,285,340 A | 2/1994 | Ju et al. | 360/119 |
| 5,452,164 A | 9/1995 | Cole et al. | 360/113 |
| 5,473,491 A * | 12/1995 | Fujisawa et al. | 360/126 |
| 5,606,478 A | 2/1997 | Chen et al. | 360/126 |
| 5,802,700 A | 9/1998 | Chen et al. | 29/603.14 |
| 5,812,350 A | 9/1998 | Chen et al. | 360/126 |
| 5,864,450 A | 1/1999 | Chen et al. | 360/113 |
| 5,901,432 A | 5/1999 | Armstrong et al. | 29/603.14 |
| 6,018,862 A | 2/2000 | Stageberg et al. | 29/603.14 |
| 6,072,670 A | 6/2000 | Furuichi et al. | 360/126 |
| 6,104,576 A | 8/2000 | Santini | 360/126 |
| 6,278,580 B1 * | 8/2001 | Sasaki | 360/126 |
| 6,301,075 B1 | 10/2001 | Sato | 360/126 |
| 6,317,288 B1 * | 11/2001 | Sasaki | 360/126 |
| 6,353,995 B1 * | 3/2002 | Sasaki et al. | 360/317 |
| 6,477,005 B1 * | 11/2002 | Sasaki | 360/126 |
| 6,662,433 B1 | 12/2003 | Sato | 29/603.14 |
| 6,738,232 B1 * | 5/2004 | Sasaki | 360/317 |
| 6,785,955 B1 * | 9/2004 | Chen et al. | 360/126 |
| 2001/0022704 A1 | 9/2001 | Hong | 360/126 |
| 2002/0048117 A1 | 4/2002 | Ostrowski et al. | 360/126 |
| 2002/0105757 A1 | 8/2002 | Oki et al. | 360/126 |
| 2003/0030940 A1 | 2/2003 | Matono | 360/126 |
| 2003/0169534 A1 | 9/2003 | Santini | 360/126 |
| 2003/0223150 A1 * | 12/2003 | Lee | 360/126 |
| 2004/0012884 A1 * | 1/2004 | Sato et al. | 360/126 |

(Continued)

FOREIGN PATENT DOCUMENTS

JP      61110319      5/1986

(Continued)

Primary Examiner—Craig A. Renner
(74) Attorney, Agent, or Firm—Zilka-Kotab, PC (57) ABSTRACT

A magnetic write head having a metal, non-magnetic write gap that extends only partially to the magnetic back gap, the remainder of the distance between the pole tip and the back gap being a magnetic material. The elimination of the seed layer reduces the amount of milling required to perform the desired notching needed to form a self aligned pedestal on the first pole and voids electrolytic corrosion of the back gap during plating.

6 Claims, 13 Drawing Sheets

U.S. PATENT DOCUMENTS

| | | | |
|---|---|---|---|
| 2004/0027716 A1* | 2/2004 | Chen et al. | 360/126 |
| 2004/0080867 A1* | 4/2004 | Han et al. | 360/123 |
| 2004/0218306 A1* | 11/2004 | Sato et al. | 360/123 |
| 2005/0068676 A1* | 3/2005 | Lille et al. | 360/126 |
| 2005/0128639 A1* | 6/2005 | Sasaki et al. | 360/126 |

FOREIGN PATENT DOCUMENTS

| | | |
|---|---|---|
| JP | 63293712 | 11/1988 |
| JP | 5225521 | 9/1993 |
| JP | 10040512 | 2/1998 |
| JP | 11283214 | 10/1999 |
| JP | 2002319108 | 10/2002 |

* cited by examiner

MAGNETIC WRITE HEAD WITH GAP TERMINATION LESS THAN HALF DISTANCE BETWEEN PEDESTAL AND BACK GAP

FIELD OF THE INVENTION

The present invention relates to magnetic recording and more particularly to a method of manufacturing an inductive write head having a metal write gap layer.

BACKGROUND OF THE INVENTION

Computer systems generally utilize auxiliary memory storage devices having media on which data can be written and from which data can be read for later use. A direct access storage device (DASD) such as a disk drive incorporating a rotating magnetic disks is commonly used for storing data in magnetic form on the disk surfaces. Data is recorded on concentric, radially spaced tracks on the disk surfaces, and magnetic heads are used to write the data to and read the data from the tracks on the disk surfaces.

Data is written onto a disk by a write head that includes a magnetic yoke having a coil, passing there through. When current flows through the coil, a magnetic flux is induced in the yoke, which causes a magnetic field to fringe out at a write gap. It is this magnetic field that writes data, in the form of magnetic transitions, onto the disk. Currently, such heads are thin film magnetic heads, constructed using material deposition techniques such as sputtering and electroplating, along with photolithographic techniques that include the use of photoresist masks.

Examples of such heads include a first magnetic pole, formed of a material such as NiFe which might be plated onto a substrate after sputter depositing an electrically conductive seed layer. Thereafter a magnetic pedestal could be constructed at a portion of the pole intended as a pole tip and where a write gap is to be formed. The pedestal is generally in the form of a magnetically soft, high magnetic saturation (high Bsat) material, such as CoFe or $Ni_{55}Fe_{45}$. A high magnetic saturation material is desired because of its ability to concentrate magnetic flux into a small pole tip region for emitting a concentrated magnetic field therefrom. Opposite the pedestal, at a back end of the magnetic pole, a magnetic back gap can be formed. A back gap is the term generally used to describe a magnetic structure that magnetically connects first and second poles to form a completed magnetic yoke as will be described. Although the back gap is constructed of a magnetic material, it need not have as high a magnetic saturation as the pedestal, because it can be constructed to have a much larger cross sectional area. A coil can be formed over the first pole, between the pedestal and the back gap and can be electrically isolated from the pole and yoke by an insulation layer, which could be alumina ($Al_2O_3$) or hard baked photoresist. A second pole formed over the first pole completes the magnetic yoke, being magnetically connected with the first pole by the write gap and being magnetically separated from the first pole and the pedestal by a thin layer of non-magnetic material called a write gap.

The write gap material has traditionally been constructed of a thin layer of non-magnetic dielectric material, which has usually been Alumina or $SiO_2$. This thin layer of write gap material is generally deposited as a full film on a planarized surface consisting of the top of the pedestal, the top the coil insulation, the top of the back gap material, and the top of a layer of insulation in the field area.

In order to magnetically connect the second pole with the back gap material, an opening must be created in the write gap material over the back gap. Generally this has been done by spinning on a thin photoresist layer and applying photolithographic techniques to form a photoresist mask that has an opening at the back gap and covers all other areas. A material removal process such as wet etching or ion milling would then be performed to remove the portion of the write gap material over the back gap, exposing the back gap.

Some head designs require the formation of a P2 pedestal in the pole tip area. This P2 pedestal is formed directly over the first pedestal, but on top of the write gap. The two pedestal portions can be self aligned by using the upper P2 pedestal as a mask, and then ion milling to notch into the first pole creating a self aligned pedestal directly under the upper pedestal.

However, since the write gap is generally constructed of a dielectric material such as alumina or $SiO_2$, an electrically conductive seed layer must be deposited prior to plating the upper P2 pedestal. Therefore, in order to form the desired notch in the first pole, the ion mill process must remove not only the desired magnetic material of the first pole, and the non-magnetic material of the write gap, but must also remove the seed layer from the write gap. This requires more extensive ion milling than would be necessary if the seed were not there. An undesirable byproduct of the ion mill process is that in addition to removing the desired write gap and lower pole material, it also undesirably consumes the upper pole pedestal. Therefore, the more extensive the ion mill is the more the upper pole pedestal will be consumed. The additional milling required to remove the seed layer, also means that additional upper pole material must be removed.

The presence of a seed layer on the write gap also degrades magnetic performance. In a most preferred arrangement, a magnetically soft high magnetic moment, high saturation (high Bsat) material would occupy the space closest to the write gap in the pole tip region. This is because this is the region where magnetic flux is most desirably concentrated in order to generate the strongest possible magnetic field at the write gap. However, the seed layer deposited on the write gap is not the most desirable, magnetically soft, high moment, high Bsat material, but is by necessity the material closest to the write gap. Therefore, the most desirable material (that which is plated over the seed layer) gets pushed up to a less desirable location.

Therefore, eliminating the need for a seed layer over the write gap would provide several advantages. One way to eliminate the need for such a seed would be to make use an electrically conductive write gap, such as a metal write gap. One possible material could be for example Rh. However, the use of such metallic write gap materials presents its own challenges. For example, the material removal process needed to remove the metal write gap material over the back gap area might be corrosive to the magnetic back gap material. Furthermore, once the back gap has been exposed, the large surface area of the metal write gap material combined with the much smaller area of the back gap creates a severe electrolytic reaction, with the back gap essentially becoming a sacrificial anode. When exposed to the plating bath during plating of the second pole, the back gap becomes severely corroded and full of voids. The voids in the back gap can even trap plating solution which can continue the corrosion even in the completed head leading to in situ failure of the head.

Therefore, there remains a strong felt need for a manufacturing process that will allow the use of a conductive metal write gap that will address the corrosion issues typically associated with such a metal write gaps. Such a method would preferably utilize existing manufacturing techniques and not result in inordinate extra manufacturing processes.

SUMMARY OF THE INVENTION

The present invention provides a magnetic write head having an electrically conductive metal write gap that extends only partially to a back gap of the write head. The remainder of the distance between the pole tip and the back gap can comprise a magnetic material.

The present invention provides the advantages of using a metal write gap, that is that no seed layer is required to plate magnetic structures there over. This allows the most desirable high magnetic moment, high Bsat material to be deposited directly on the write gap material where it is most needed. The elimination of the seed layer also reduces the amount of milling required to perform the desired notching needed to form a self aligned pedestal on the first pole. The present invention provides these benefits avoiding the electrolytic corrosion of the back gap during plating. This achieved by minimizing the amount of metal write gap material available for electrolytic reaction with the back gap.

BRIEF DESCRIPTION OF THE DRAWINGS

For a fuller understanding of the nature and advantages of this invention, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out this invention. This description is made for the purpose of illustrating the general principles of this invention and is not meant to limit the inventive concepts claimed herein.

Figure 1:
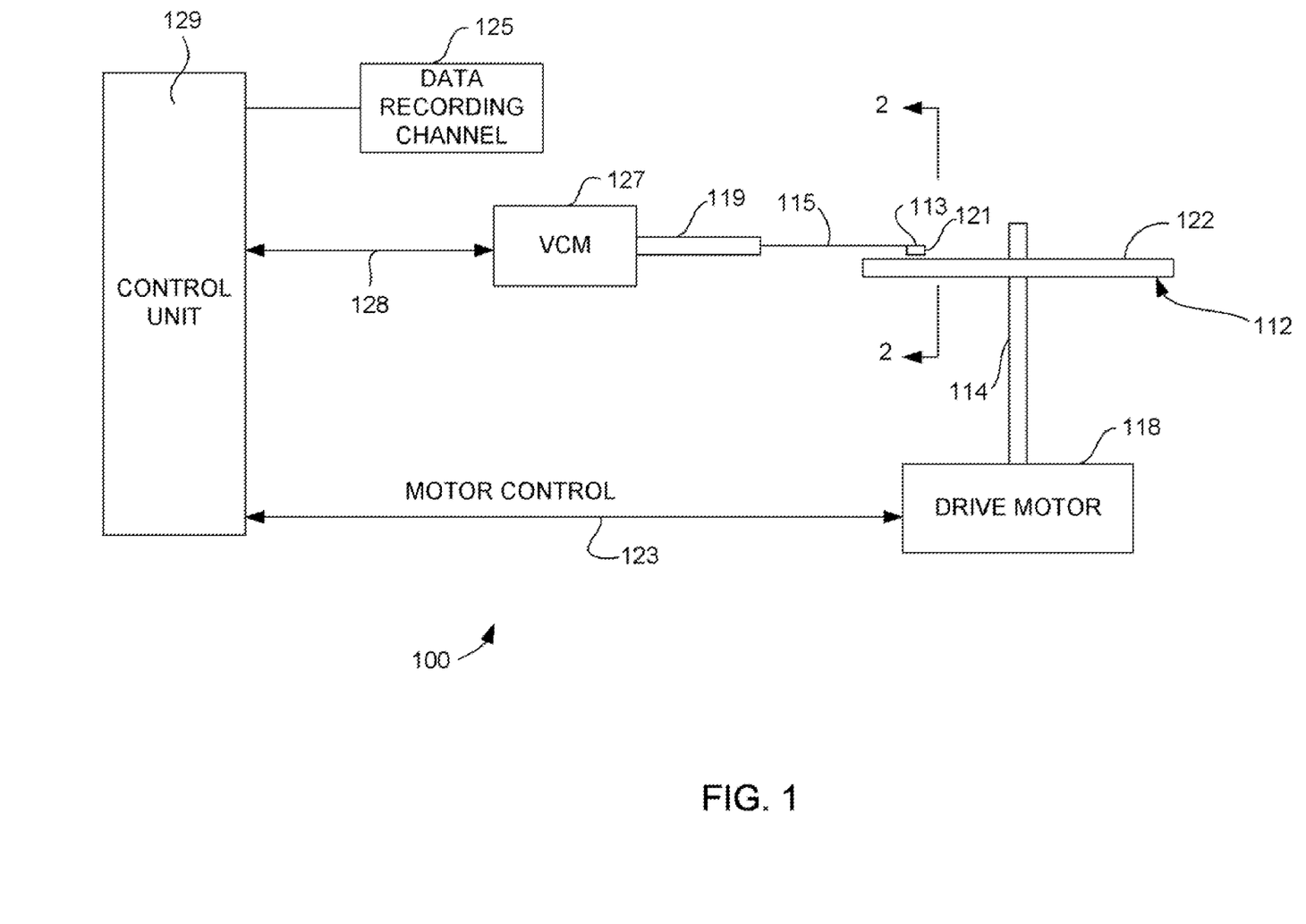
FIG. 1 is a schematic view illustrating a magnetic data storage system in which the present invention can be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 is moved radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
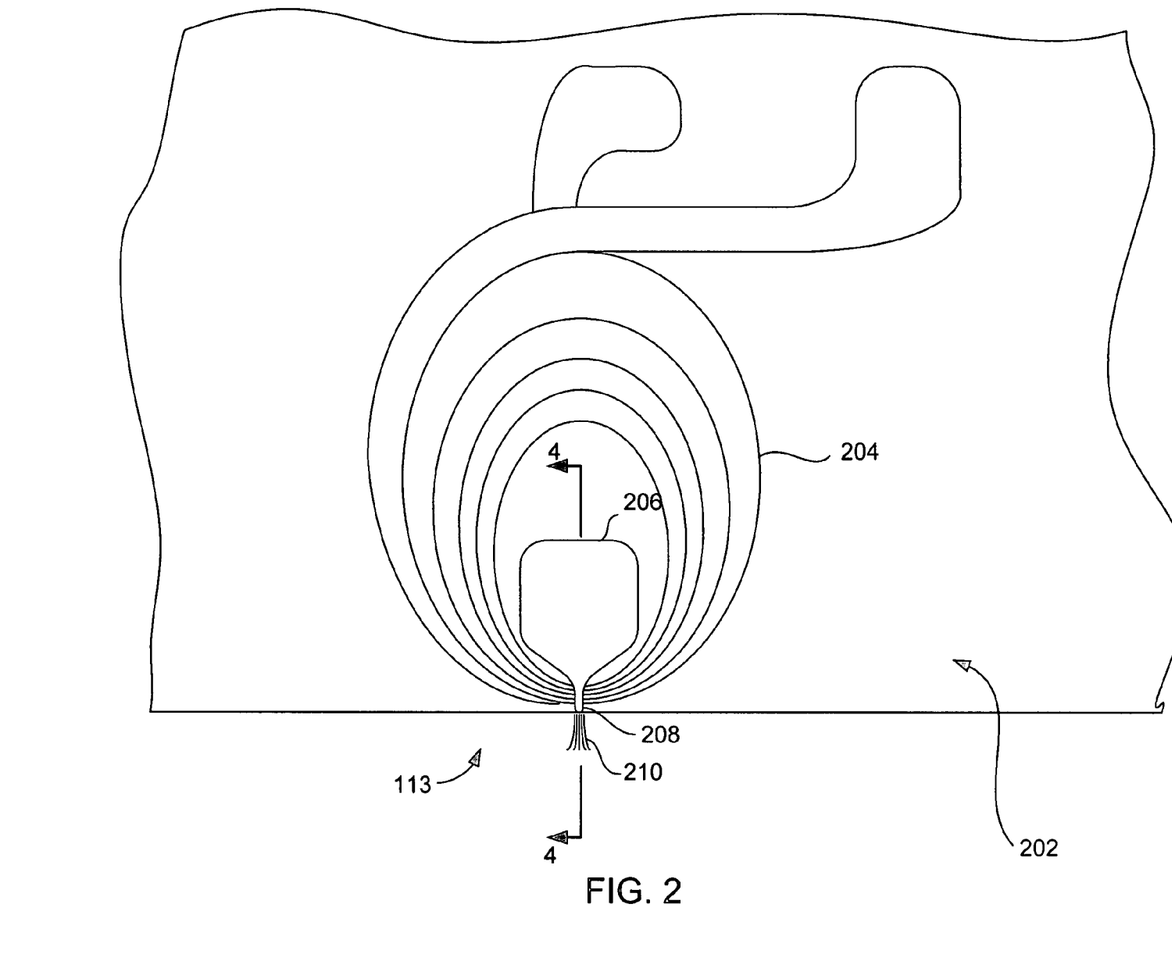
FIG. 2 is a plan view taken from line 2—2 of FIG. 1, shown enlarged, magnetic write head of the present invention.

This invention provides a method of forming a write element. With reference to FIG. 2, a plan view of an exemplary write element 202, can be seen in relation to a slider 113. A coil 204, passing through a magnetic yoke 206, induces a magnetic flux in the yoke 206. The magnetic flux in the yoke 206, in turn causes a magnetic field to fringe out at the pole tip 208. It is this fringing field 210 that writes magnetic signals onto a nearby magnetic medium.

Figure 3:
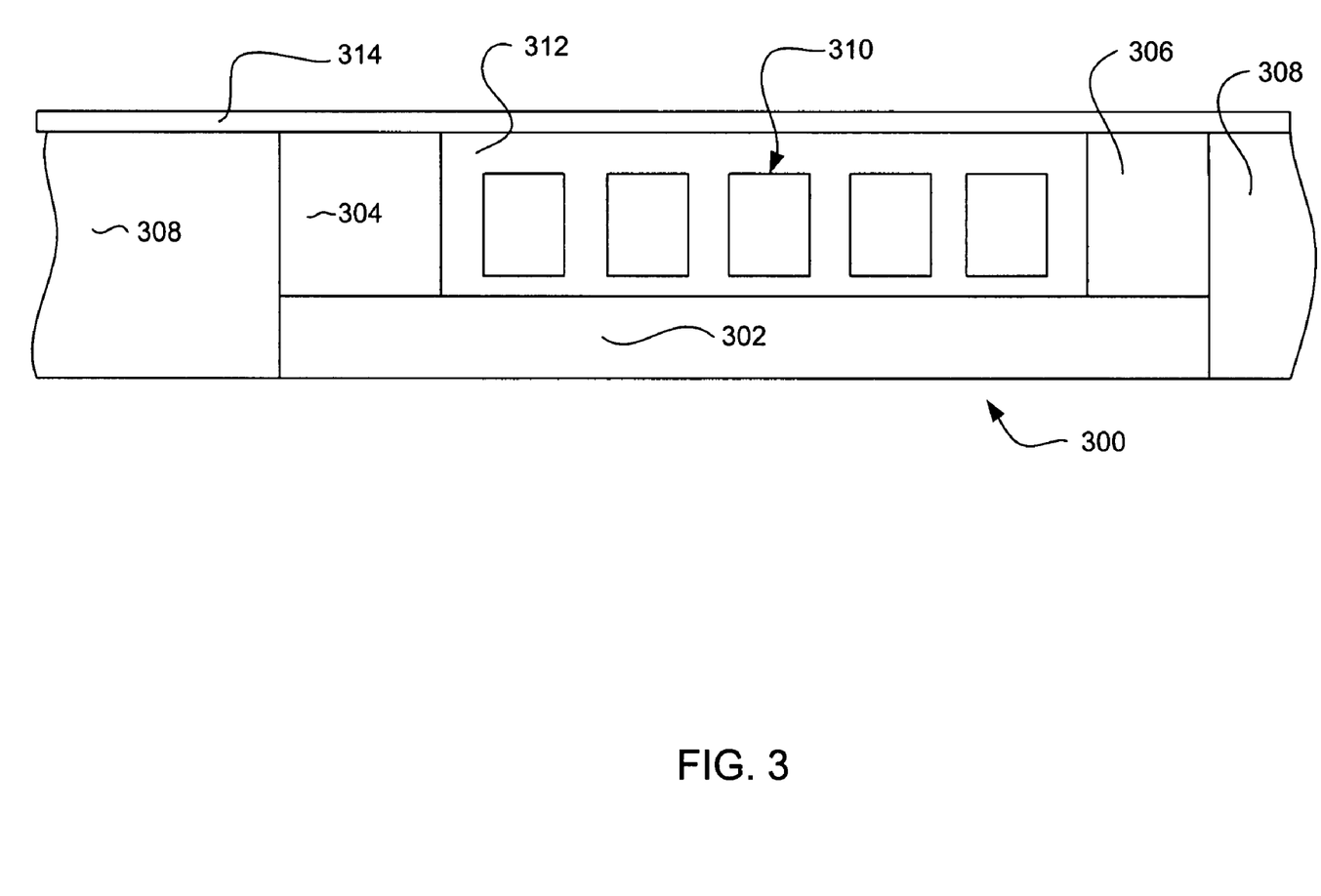
FIGS. 3–6, are a cross sectional views illustrating various stages of development of a write head having a metal write gap and constructed using prior art manufacturing methods.

As discussed above with reference to the Background of the Invention, it would be desirable to construct a magnetic write head using a conductive, metal write gap. However, attempts to construct such a metal write gap using processes similar to those used to construct dielectric write gaps have met with serious challenges, which can be better understood with reference to FIGS. 3–6. With reference to FIG. 3, a write head 300 in an intermediate stage of construction includes a first pole 302 having a first pedestal 304 in a pole tip region. A magnetic back gap 306 is provided on the first pole 302 at an end opposite the first pedestal 304. A dielectric material 308 such as alumina $Al_2O_3$ may be provided in the areas outside of the pole 302. A magnetic coil 310 passes through the head 300 over the first pole 302, between the first pedestal 304 and the back gap 306 and is insulated by an insulation layer 312. An electrically conductive, non-magnetic write gap 314 could be provided on top of the insulation layer 312, pedestal 304, and back gap 306.

Figure 4:
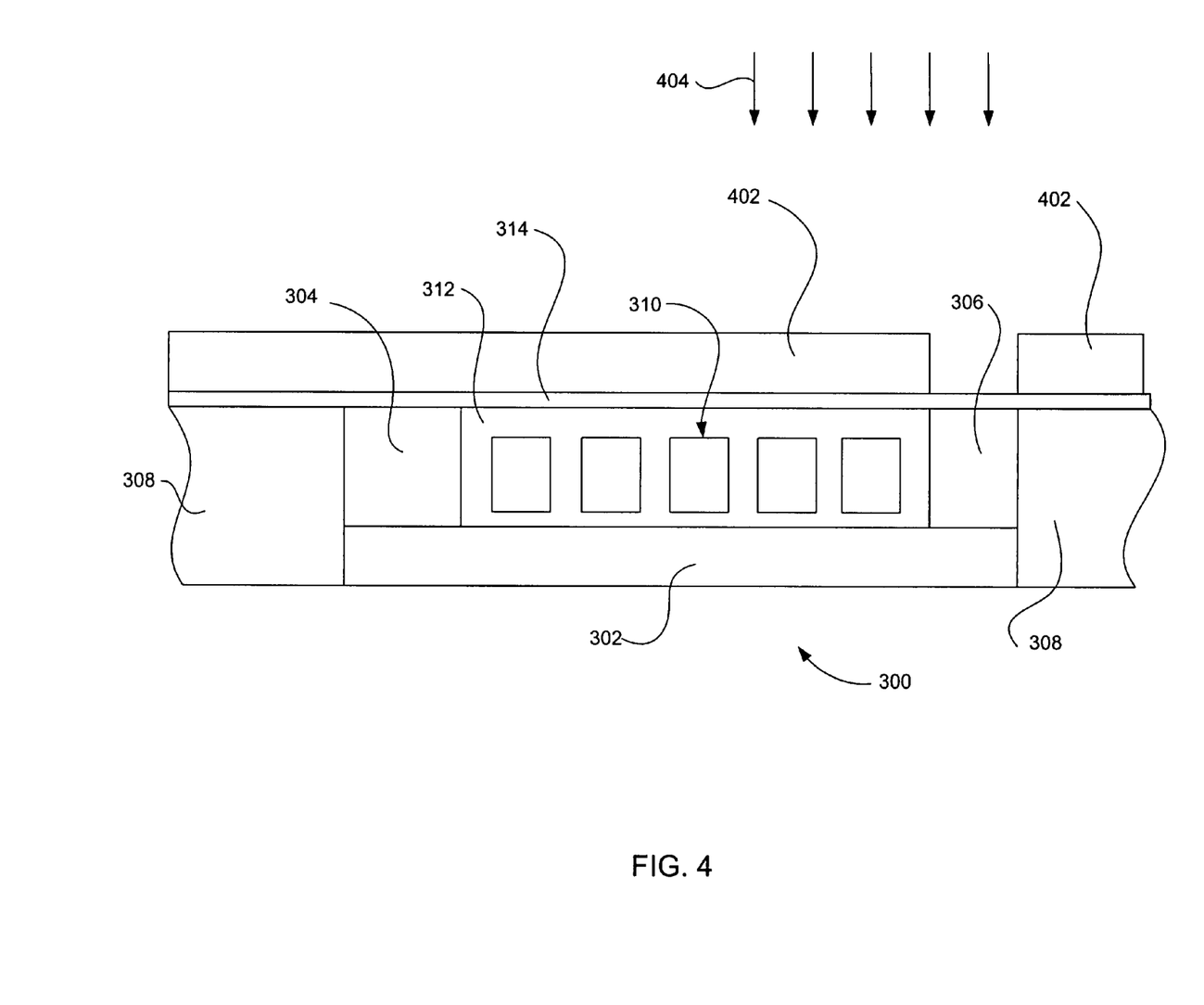
Figure 5:
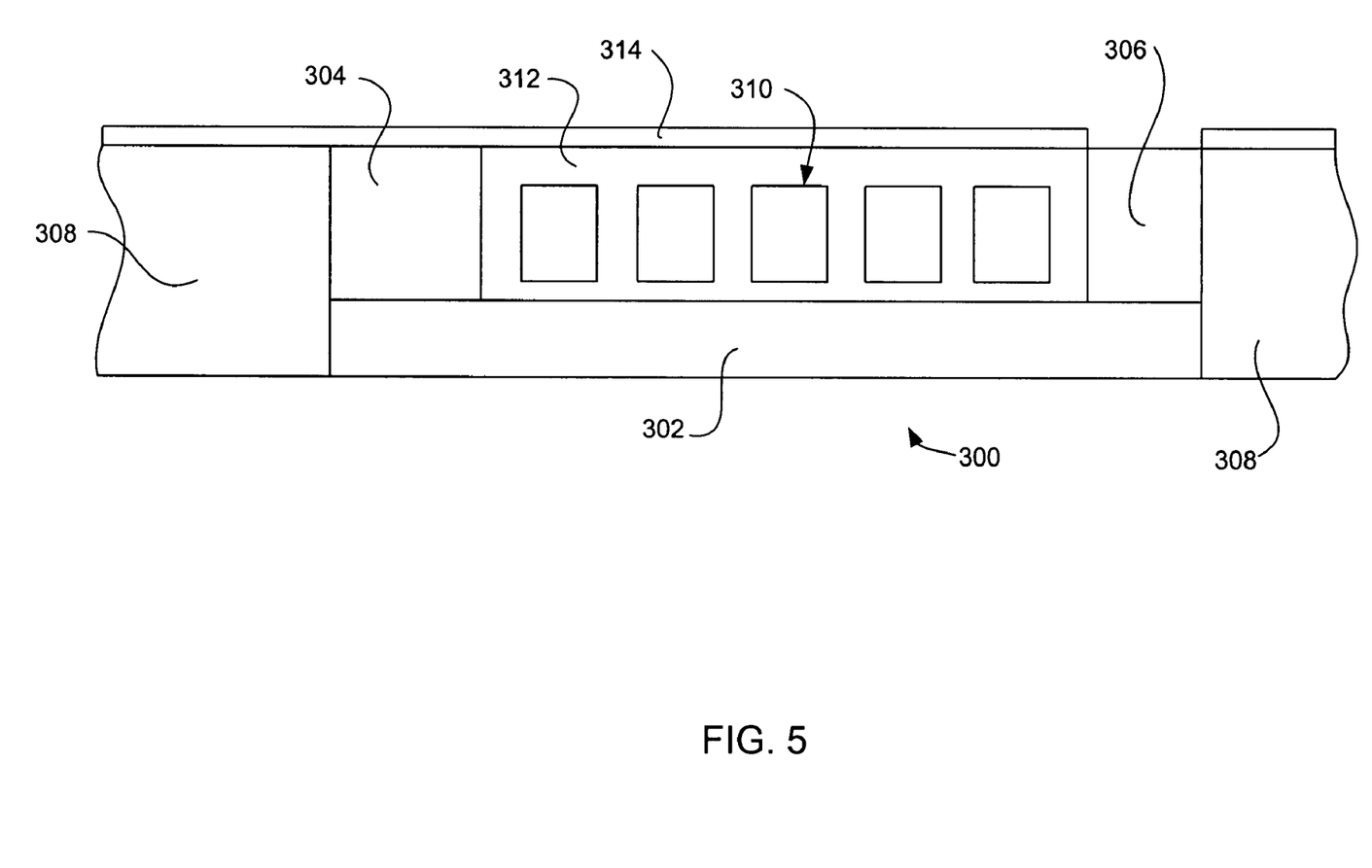

With reference now to FIG. 4, a photoresist mask 402 could then be formed according to photolithographic methods familiar to those skilled in the art, leaving an opening over the back gap 306. A material removal process 404, such as for example, ion milling is performed to remove the uncovered portions of the write gap material. The photoresist mask 402 can then be removed, resulting in the structure shown in FIG. 5.

Figure 6:
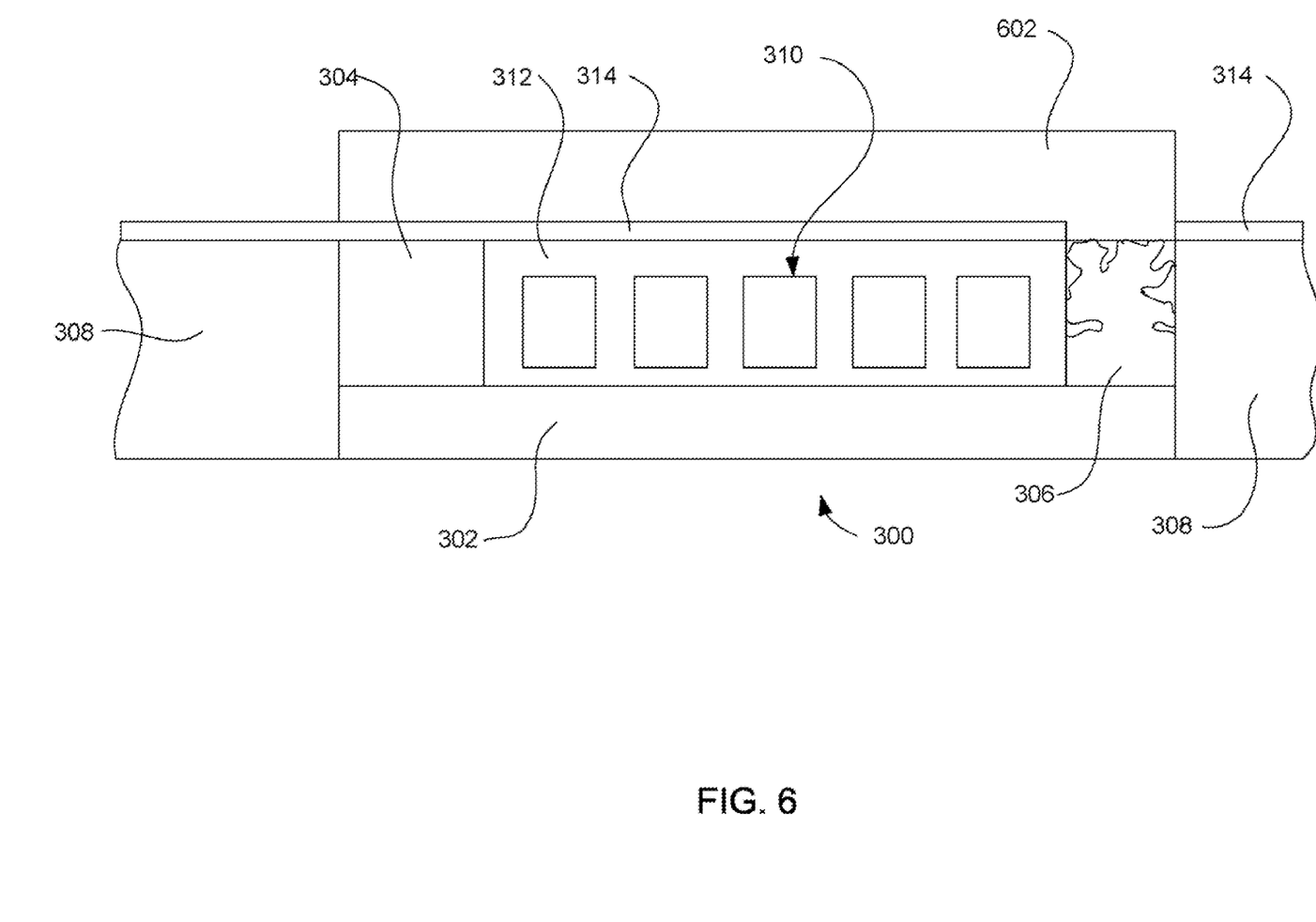

With reference to FIG. 6, a second magnetic pole 602, can be plated onto the back gap 306. Optionally a magnetic pedestal could be formed and a magnetic pole could be formed thereover. As can be seen, the back gap at this point is severely corroded and very little back gap material actually contacts the pole 602. In the embodiment shown in FIGS. 5 and 6, about 5% or less of the area is CoFe and the rest is the metal write gap such as Rh. In the acidic plating solution, the Co becomes $Co^{2+}+2e^-$, and the hydrogen ions $2H^++2e^-$ become hydrogen gas $H_2$, and as mentioned the corrosion of the back gap is greatly exacerbated by the large area of Rh write gap material and very small area of back gap material.

Figure 7:
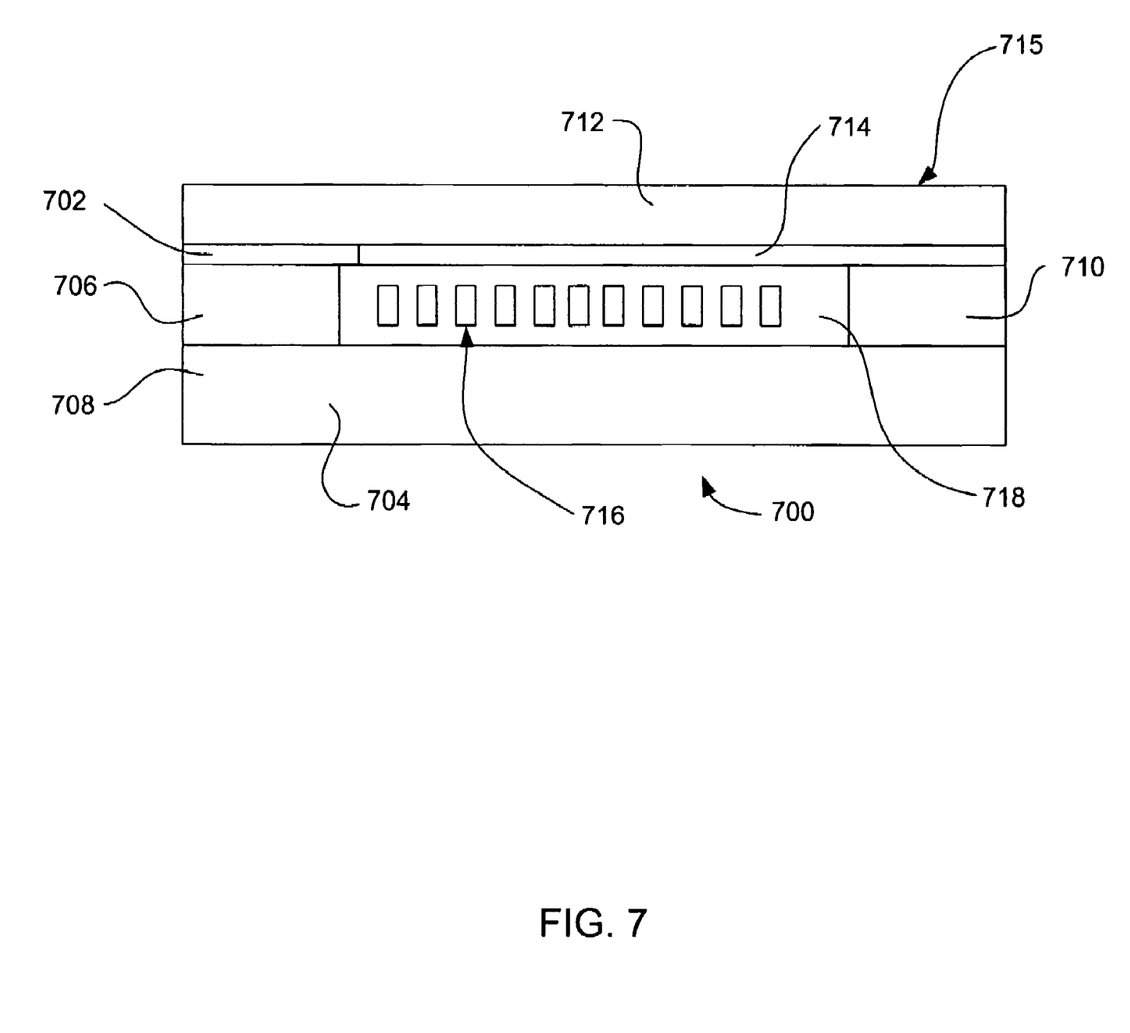
FIG. 7 is a cross sectional view of a magnetic write head according to an embodiment of the present invention.

With reference now to FIG. 7, a magnetic write head 700 constructed according to an embodiment of the present invention achieves the benefits of an electrically conductive write gap 702, while overcoming the corrosion problems described above with reference to FIGS. 3–6. The magnetic write head 700 includes a first pole 704 having a first magnetic pedestal P1 706 formed there over at a pole tip region 708, and a magnetic back gap 710 at an end opposite the pole tip 708. A second pole 712 is formed over the first pole 704, and is magnetically connected with the back gap 710 by a magnetic layer 714. The second pole 712 is separated from the P1 pedestal 706 by the write gap layer 702. The first and second poles 712, along with the back gap 710, magnetic layer 714, and P1 pedestal 706 form a magnetic yoke, generally referred to as 715. An electrically conductive coil 716, only a portion of which is shown in cross section in FIG. 7, passes between the first and second poles 704, 712 between the P1 pedestal 706 and back gap 710. The coil is electrically isolated from the poles 704, 712, pedestal 706 and back gap 710 by an insulation layer 718, which could be for example alumina or hard baked photoresist.

With reference still to FIG. 7, the non-magnetic write gap layer 702 extends only partially beyond the P1 pedestal. The remainder of the material beneath the second pole 712 is a magnetic material such as NiFe. As will be seen below, this greatly enhances manufacturability, avoiding corrosion of the back gap, while advantageously allowing the use of a metal write gap 702.

Figure 8:
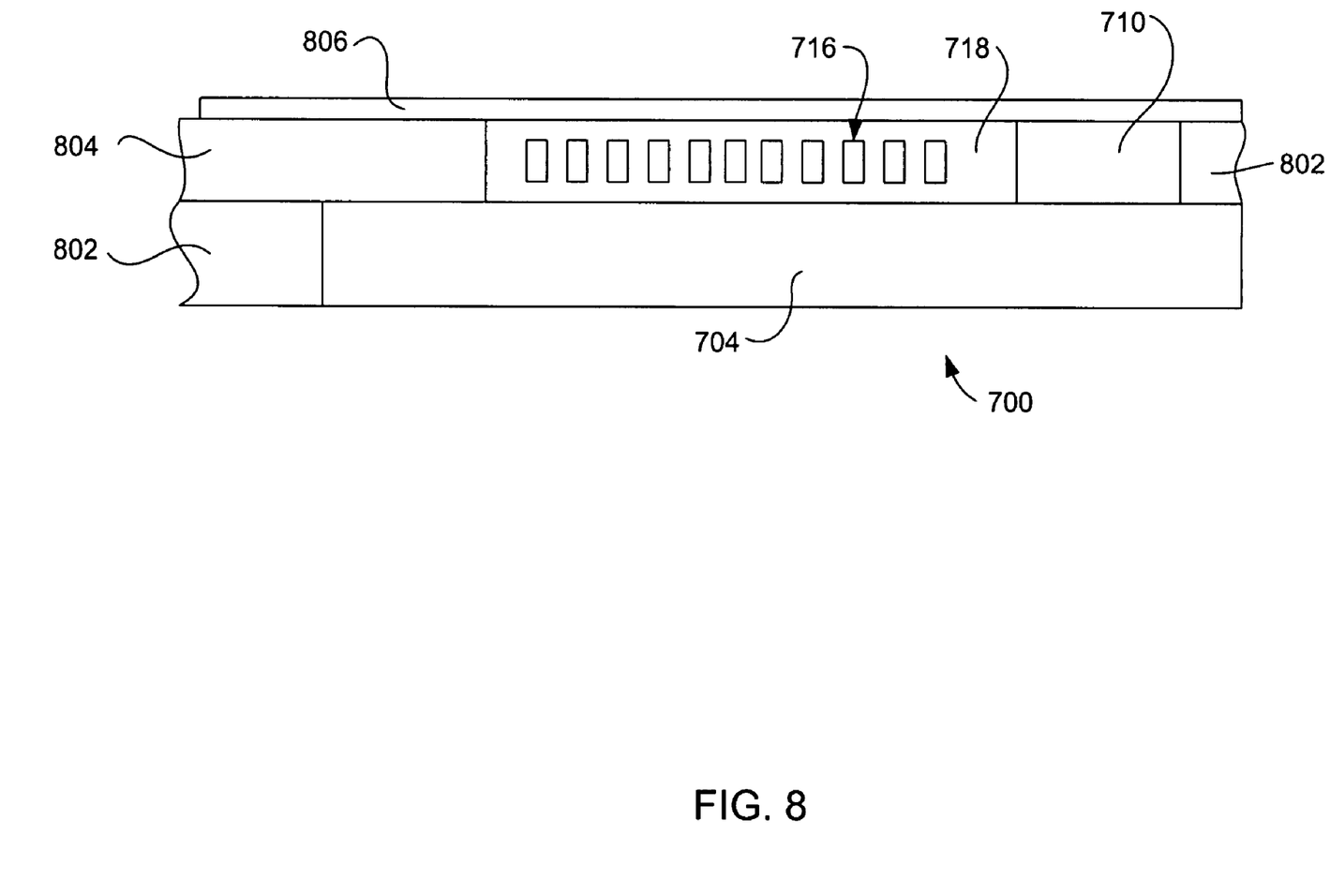
FIGS. 8–12 are cross sectional views illustrating various stages of manufacture of a write head according to an embodiment of the present invention.

With reference now to FIG. 8, the first magnetic pole 704 is provided. Fill material 802 such as alumina may be provided in the field areas. A magnetic layer 804, which will become the P1 pedestal 706, is provided over the first pole 704. The magnetic material is preferably a magnetically soft, high Bsat material such as laminated layers of NiFe or CoFe, and can be formed by electroplating. The back gap 710 is provided opposite the magnetic layer 804, and can be formed in the same manufacturing step and of the same material as the as the magnetic layer 804. A coil 716, and surrounding insulation 718, is formed by methods familiar to those skilled in the art, such as frame plating within a patterned hard baked photoresist or by damascene methods.

With continued reference to FIG. 8, the upper surface of the magnetic layer 804, insulation 718, and back gap 710 and field fill 802 are planarized by a process such as chemical mechanical polishing to create a smooth planar surface. A full film layer of non-magnetic, electrically conductive write gap material 806 such as Rh can then be deposited. Deposition of the Rh can be accomplished by sputter deposition.

Figure 9:
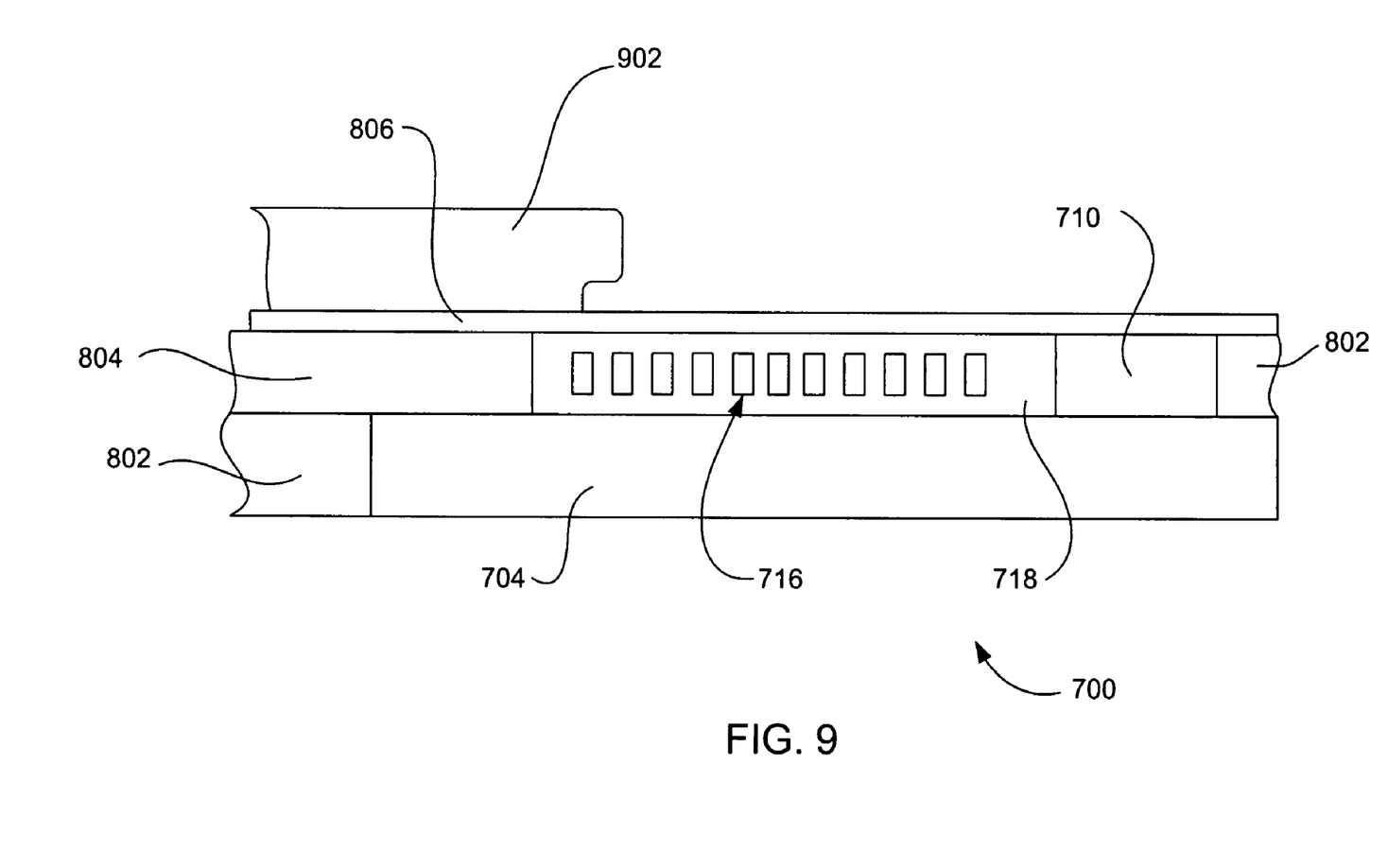

With reference now to FIG. 9, a photoresist mask 902 is then formed over the region containing the magnetic layer 804 that will become the P1 pedestal 706. The photoresist mask 902 is preferably a bilayer photoresist, but could be a simple single layer mask.

Figure 10:
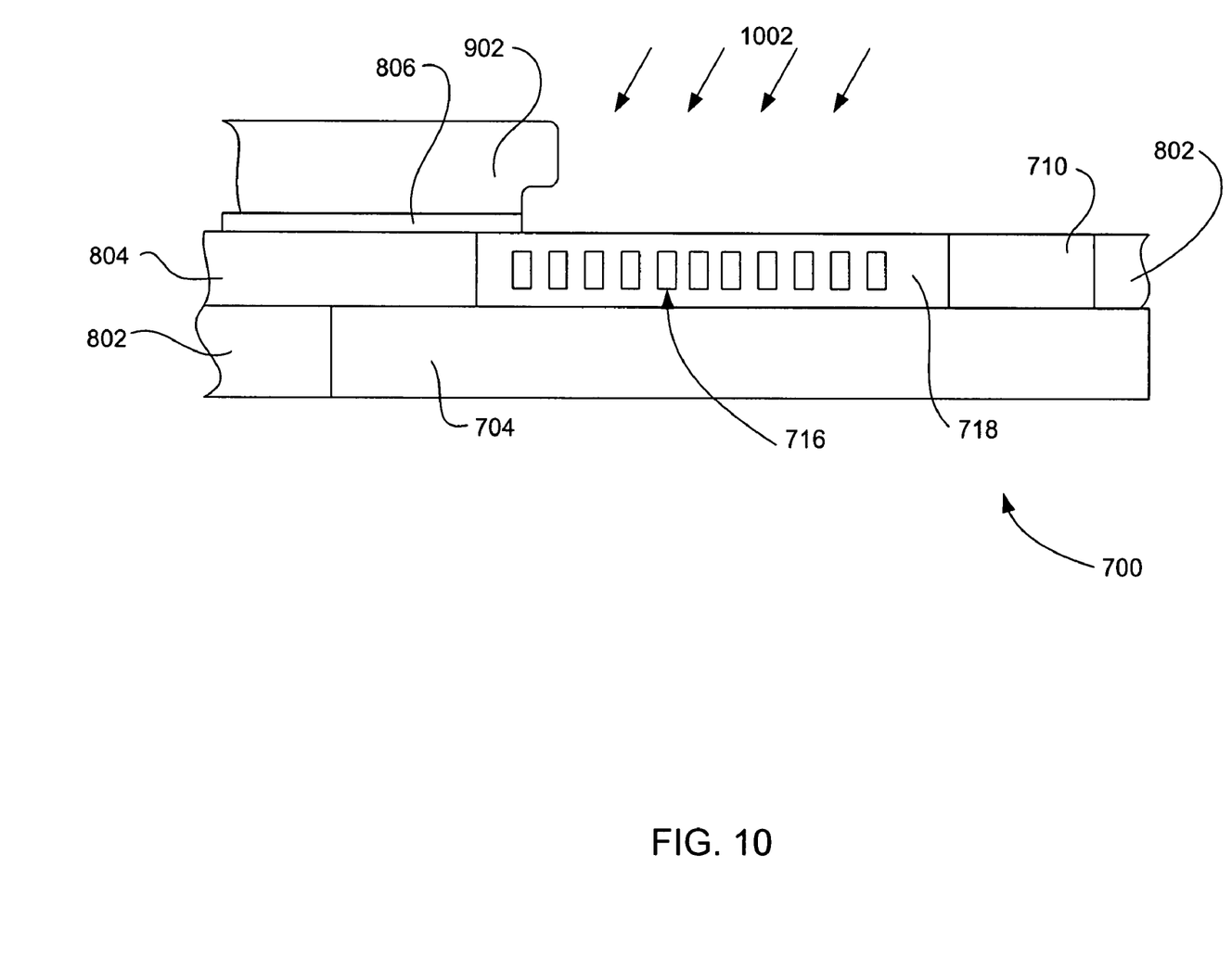
Figure 11:
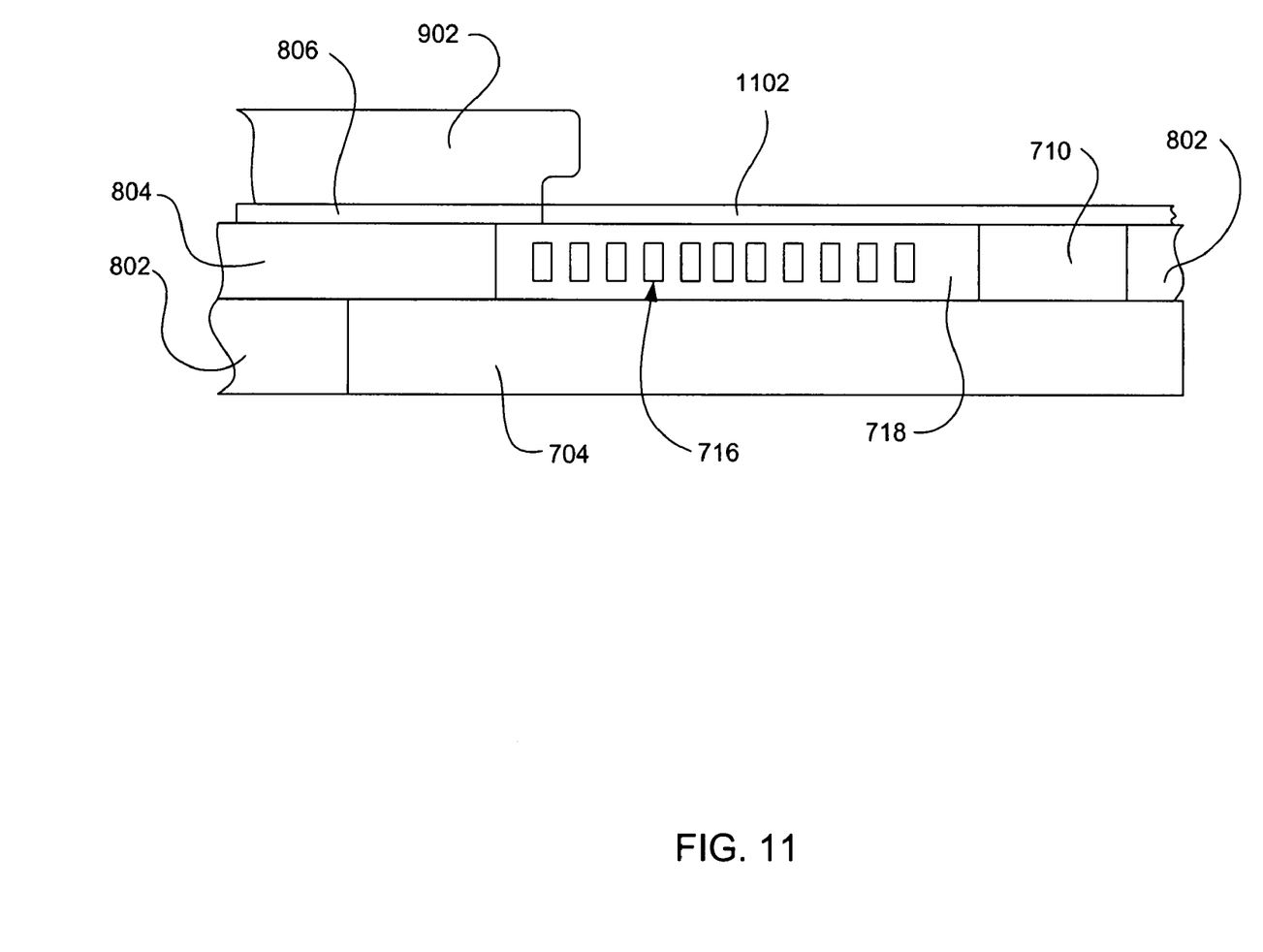
Figure 12:
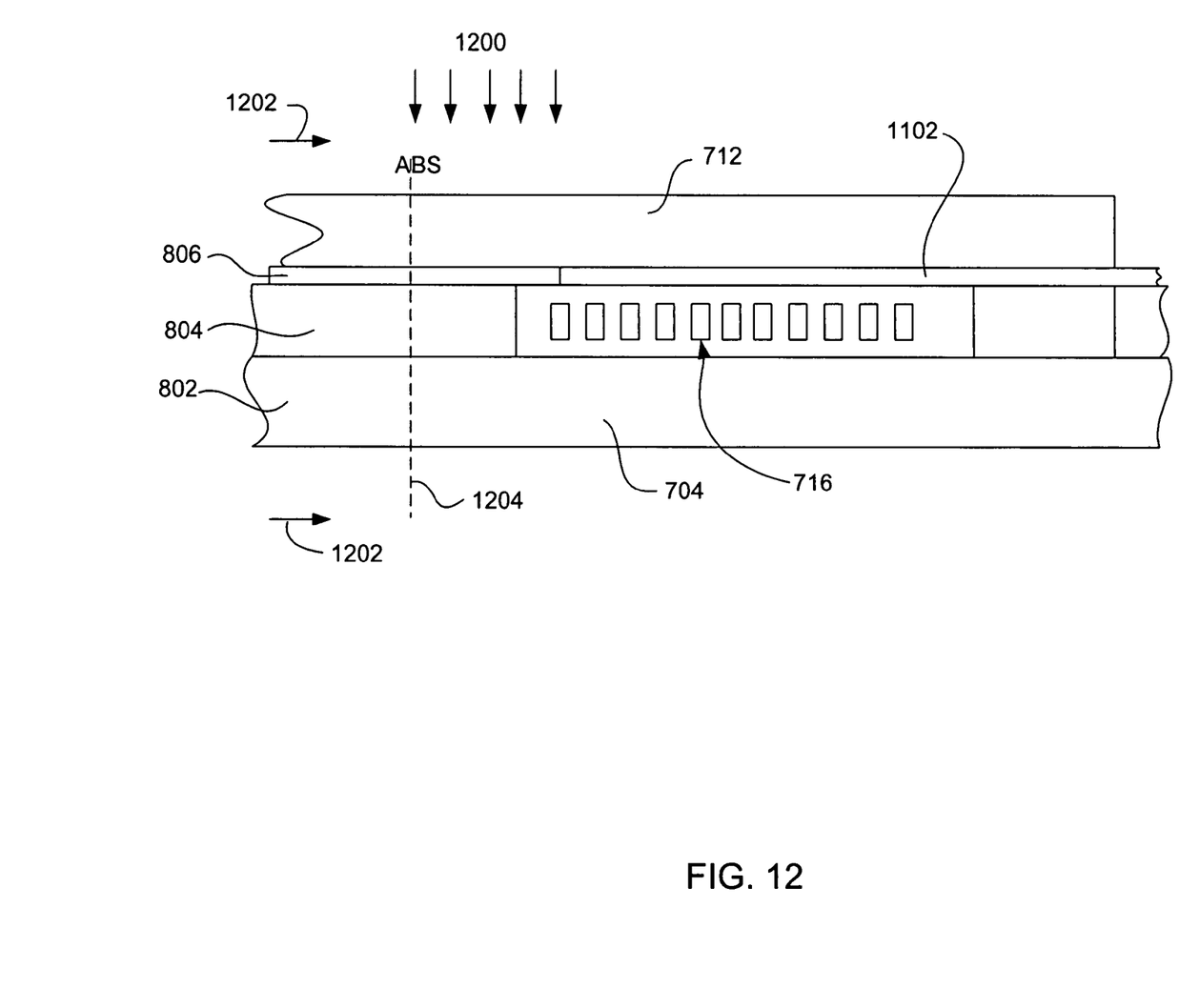

Then, with reference to FIG. 10 an ion mill 1002 can be performed to remove selected portions of the write gap material layer 806 that are not covered by the photoresist mask. Thereafter, with reference to FIG. 11, with the photoresist mask still in place, a layer of magnetic material 1102, such as NiFe is deposited. The layer of magnetic material 1102 is preferably about the same thickness as the write gap material layer 806, but can have a thickness plus or minus 50% that of the write gap material layer 806. The magnetic layer 1102 can be deposited by sputter deposition. With reference to FIG. 12, the photoresist mask 902 can be removed and the second pole 712 can be formed by electroplating. It will be appreciated that, when the second pole 712 is being electroplated there is very little metal write gap material available and the majority of the surface area is covered by magnetic material 714. This virtually eliminates the corrosion problem experienced by the method described with reference to FIGS. 3–6.

In fact the write gap material 702 preferably reaches less than 50 percent of the distance between the P1 pole 706 and the back gap 710 the rest of the distance comprising the magnetic material 714. More preferably, the write gap material 702 preferably reaches less than 20 percent of the distance to the back gap 710, the rest of the distance comprising the magnetic material 714. Similarly, the area of the write head 700 covered by the write gap material 702 is preferably less than 50% write gap material 702, the remainder being magnetic material 714. More preferably, the area of the write head consumed by the write gap material is less than 20% write gap material 702, the remainder being the magnetic material 714.

With continued reference to FIG. 12, after electroplating the second pole 712, an ion milling operation 1200 can then be performed if desired, using the second pole 712 as a mask to self align the P1 pedestal by notching according to method that will be familiar to those skilled in the art. It will be appreciated that the write gap 702 does not have a seed layer deposited thereon as would be necessary if the write gap had been constructed of a dielectric material. Therefore, the ion milling operation 1200 can be performed in a less invasive manner, removing less of the second pole 712 in the process than would be required if an additional seed layer had to be removed. A lapping operation 1202 can then be performed to up to an ABS location 1204 to form the head 700.

Figure 13:
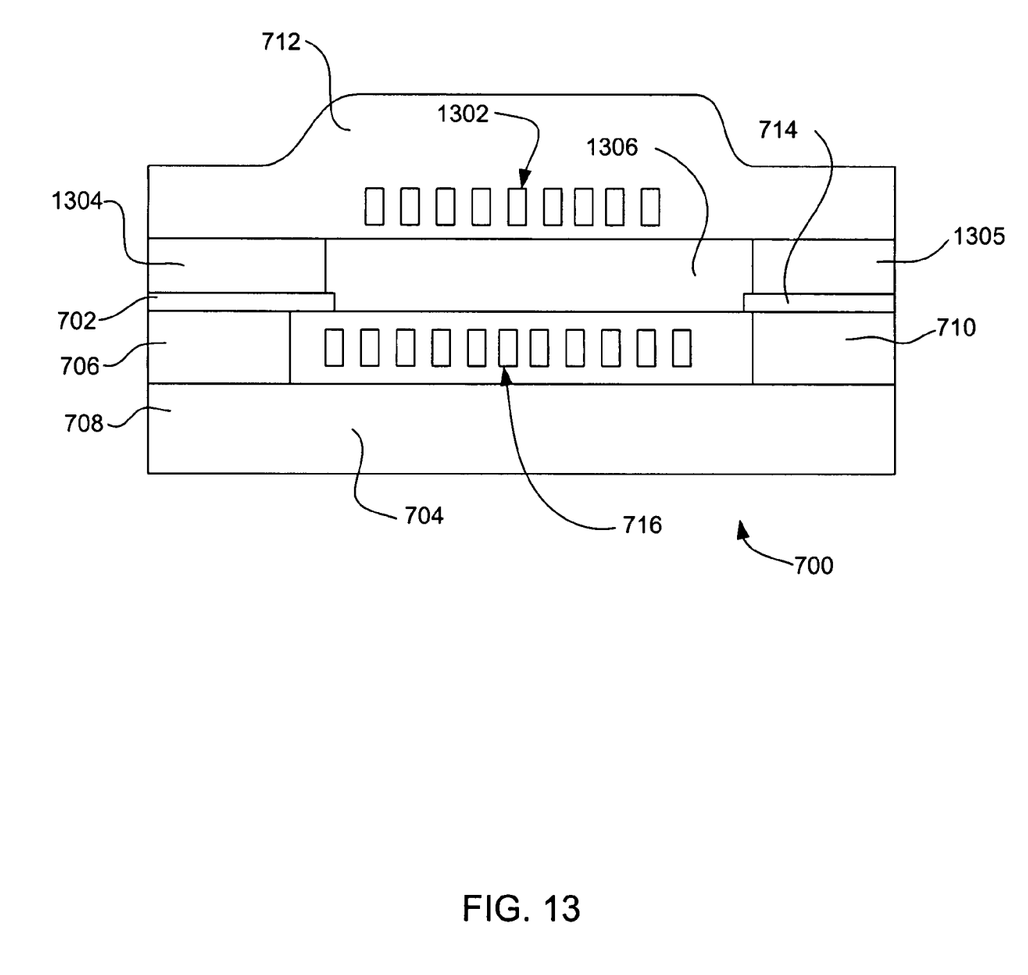
FIG. 13 is a cross sectional view of an alternate embodiment of the present invention.

With reference to FIG. 13, another embodiment of the invention includes a second coil layer 1302 and P2 pedestal 1304, and a second back gap pedestal 1305. This embodiment can be constructed according to methods described above with the additional steps of plating the P2 pedestal 1304 and forming the second coil 1302 and its surrounding insulation layer 1306. The pedestal 1304 can then be used as a mask, to notch the P1 pedestal 706 in a manner similar to that described above and with the same advantage of not requiring removal of additional seed layer material. In this embodiment, however, the magnetic material 714, is preferably disposed substantially only between the back gap portions 710, 1305 in order to prevent shorting between the coils 716 and the magnetic yoke.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic write head, comprising:
a magnetic pole having first and second ends;
a magnetic pedestal formed over said magnetic pole at said first end of said magnetic pole;
a magnetic back gap layer formed over said magnetic pole at said second end of said magnetic pole, said pedestal and said back gap layer having a distance therebetween;
a non magnetic write gap material formed over said pedestal, extending toward said back gap layer and having a termination between said pedestal and said back gap layer; and
a magnetic layer formed over said back gap layer, extending toward said pedestal and terminating at said termination of said non magnetic write gap material;
wherein said non magnetic write gap material extends less than half said distance between said pedestal and said back gap layer.

2. A magnetic write head as in claim 1, wherein said write gap material is Rh.

3. A magnetic write head as in claim 1, wherein said magnetic layer formed over said back gap layer is NiFe.

4. A magnetic write head as in claim 1, further comprising a second magnetic pole extending from said back gap layer to said pedestal, said second pole being magnetically connected with said back gap layer and being separated from said pedestal by said write gap material.

5. A magnetic write head, comprising:
a magnetic pole having first and second ends;
a magnetic pedestal formed over said magnetic pole at said first end of said magnetic pole;
a magnetic back gap layer formed over said magnetic pole at said second end of said magnetic pole, said pedestal and said back gap layer having a distance therebetween;
a non magnetic write gap material formed over said pedestal, extending toward said back gap layer and having a termination between said pedestal and said back gap layer; and
a magnetic layer formed over said back gap layer, extending toward said pedestal and terminating at said termination of said write gap material;
wherein said non magnetic write gap material extends less than 20 percent said distance between said magnetic pedestal and said back gap layer.

6. A magnetic write head, comprising:
a first magnetic pole having first and second ends;
a first magnetic pedestal formed over said first magnetic pole at said first end;
a first magnetic back gap layer formed over said first magnetic pole at said second end, said pedestal and said back gap layer having a distance therebetween;
a first material formed over said pedestal, said first material being electrically conductive and non-magnetic, said first material terminating at a termination point located between the first pedestal and the first magnetic back gap layer;
a second material formed over said first back gap layer, said second material being electrically conductive and magnetic and being a different material than said first material;
a second pedestal formed over said first material over said first pedestal;
a second back gap layer formed over said second material over said first back gap layer; and
a second magnetic pole extending between and magnetically connecting said second pedestal and said second back gap layer,
wherein said termination of said first material is located less than half the distance between the first magnetic pedestal and the first back gap layer.

* * * * *

UNITED STATES PATENT AND TRADEMARK OFFICE
CERTIFICATE OF CORRECTION

PATENT NO. : 7,215,511 B2  Page 1 of 1
APPLICATION NO. : 10/816062
DATED : May 8, 2007
INVENTOR(S) : Guthrie et al.

It is certified that error appears in the above-identified patent and that said Letters Patent is hereby corrected as shown below:

Title page, item [57]
In line 7 of the Abstract replace "voids" with --avoids--.

Signed and Sealed this

Fifteenth Day of June, 2010

David J. Kappos
*Director of the United States Patent and Trademark Office*